(12) United States Patent
Gupta (10) Patent No.: US 11,281,788 B2
(45) Date of Patent: Mar. 22, 2022

(54) TRANSIENT PLIANT ENCRYPTION WITH INDICATIVE NANO DISPLAY CARDS

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 391 days.

(21) Appl. No.: 16/459,154

(22) Filed: Jul. 1, 2019

(65) Prior Publication Data

US 2021/0004474 A1  Jan. 7, 2021

(51) Int. Cl.
  G06F 21/62 (2013.01)
  G06K 19/06 (2006.01)
  G06Q 20/34 (2012.01)
  H04L 9/08 (2006.01)

(52) U.S. Cl.
  CPC ... *G06F 21/6209* (2013.01); *G06K 19/06178* (2013.01); *G06Q 20/341* (2013.01); *H04L 9/0822* (2013.01); *G06F 2221/2107* (2013.01)

(58) Field of Classification Search
  CPC ........ G06F 21/6209; G06F 2221/2107; G06K 19/06178; G06Q 20/341; H04L 9/0822
  USPC .......................................................... 726/26
  See application file for complete search history.

(56) References Cited

U.S. PATENT DOCUMENTS

| 3,996,450 | A | 12/1976 | Kerkhoff |
| 4,670,644 | A | 6/1987 | Grayson |
| 4,720,860 | A | 1/1988 | Weiss |
| 4,819,267 | A | 4/1989 | Cargile et al. |
| 4,993,068 | A | * | 2/1991 | Piosenka ............. G06F 21/83 713/186 |
| 5,168,520 | A | 12/1992 | Weiss |
| 5,177,789 | A | * | 1/1993 | Covert .................... G06F 21/35 713/184 |
| 5,495,235 | A | * | 2/1996 | Durinovic-Johri ...... G07C 9/33 340/5.27 |
| 6,078,667 | A | 6/2000 | Johnson |
| 6,178,236 | B1 | 1/2001 | Jreij et al. |

(Continued)

OTHER PUBLICATIONS

Divya et al.; Visual Authentication Using QR Code to Prevent Keylogging; International Journal of Engineering Trends and Technology (IJETT)—vol. 20 No. 3—Feb. 2015 (Year: 2015).*

(Continued)

*Primary Examiner* — Kambiz Zand
*Assistant Examiner* — Mahabub S Ahmed
(74) *Attorney, Agent, or Firm* — Moore & Van Allen PLLC; Nicholas C. Russell (57) ABSTRACT

Embodiments of the present invention provide a system for secure communication of information that may be used to authorize communications or transfer of resources by use of a transient pliant encryption mechanism in conjunction with an indicative nano-display. The provided systems, methods, and computer program products are designed to select and apply multiple encryption algorithms in a varied fashion and update displayed information on a nano-display. Credentials for a user may be stored and securely communicated via a transient nano-display that is updated at a configured interval of time and is indecipherable to unauthorized third parties.

14 Claims, 8 Drawing Sheets

(56) References Cited

U.S. PATENT DOCUMENTS

| | | | |
|---|---|---|---|
| 6,209,104 B1* | 3/2001 | Jalili | G06F 21/36 726/18 |
| 6,991,155 B2 | 1/2006 | Burchette, Jr. | |
| 7,000,116 B2 | 2/2006 | Bates et al. | |
| 7,051,929 B2* | 5/2006 | Li | G06K 19/07 235/380 |
| 7,310,422 B2* | 12/2007 | Candelore | H04N 7/162 348/E5.004 |
| 7,379,921 B1* | 5/2008 | Kiliccote | G06Q 20/401 705/75 |
| 7,853,529 B1 | 12/2010 | Walker et al. | |
| 8,266,441 B2 | 9/2012 | Inskeep et al. | |
| 8,308,059 B2 | 11/2012 | Granucci et al. | |
| 8,315,948 B2 | 11/2012 | Walker et al. | |
| 8,667,281 B1* | 3/2014 | Chenna | H04L 9/0825 713/168 |
| 8,919,643 B2* | 12/2014 | Ashfield | G06Q 20/409 235/380 |
| 8,955,744 B2 | 2/2015 | Granucci et al. | |
| 8,973,095 B2 | 3/2015 | Smith | |
| 9,172,692 B2* | 10/2015 | Langley | G06F 21/36 |
| 9,230,254 B1* | 1/2016 | Sharifi Mehr | G06Q 20/24 |
| 9,251,637 B2 | 2/2016 | Ashfield | |
| 9,269,358 B1* | 2/2016 | Saylor | H04L 63/08 |
| 9,418,208 B2* | 8/2016 | Diehl | G06F 21/10 |
| 9,418,326 B1* | 8/2016 | Narayanaswami | G06K 19/06056 |
| 9,477,959 B2 | 10/2016 | Ashfield | |
| 9,747,539 B1* | 8/2017 | Kendall | G07F 7/0846 |
| 9,838,385 B2 | 12/2017 | DeLuca et al. | |
| 10,439,815 B1* | 10/2019 | Poder | H04L 9/0891 |
| 10,783,576 B1* | 9/2020 | Van Os | G06F 21/31 |
| 2002/0019939 A1* | 2/2002 | Yamamoto | G06Q 20/341 713/172 |
| 2002/0116626 A1* | 8/2002 | Wood | G07F 7/1008 726/27 |
| 2002/0158747 A1* | 10/2002 | McGregor | G06Q 20/3415 340/5.26 |
| 2004/0064711 A1* | 4/2004 | Fernando | G06Q 20/20 713/189 |
| 2005/0043997 A1* | 2/2005 | Sahota | G06Q 20/4093 705/16 |
| 2005/0202934 A1* | 9/2005 | Olrik | A63B 24/0062 482/8 |
| 2006/0165060 A1* | 7/2006 | Dua | G06Q 20/325 370/352 |
| 2006/0196929 A1* | 9/2006 | Kelley | G06Q 20/3574 235/380 |
| 2006/0230437 A1* | 10/2006 | Alexander Boyer | H04L 63/062 726/4 |
| 2008/0022089 A1* | 1/2008 | Leedom | H04W 12/04 713/156 |
| 2008/0077794 A1* | 3/2008 | Arnold | H04L 9/0822 713/169 |
| 2008/0104717 A1* | 5/2008 | Wu | G06F 21/84 726/34 |
| 2008/0296367 A1* | 12/2008 | Parkinson | G06Q 20/4014 235/380 |
| 2009/0183008 A1* | 7/2009 | Jobmann | G06F 21/34 713/186 |
| 2009/0249077 A1* | 10/2009 | Gargaro | G06Q 20/382 713/183 |
| 2010/0161494 A1* | 6/2010 | Slater | G07F 7/1091 705/72 |
| 2011/0047038 A1* | 2/2011 | Halevi | G06Q 20/40 705/17 |
| 2012/0017085 A1* | 1/2012 | Carter | H04L 63/0435 713/168 |
| 2012/0154290 A1* | 6/2012 | Yang | G06K 19/07707 345/169 |
| 2012/0181333 A1* | 7/2012 | Krawczewicz | G06K 19/07749 235/380 |
| 2012/0234923 A1* | 9/2012 | Tamma | G06F 21/34 235/492 |
| 2012/0311320 A1* | 12/2012 | Brown | H04L 9/3226 713/155 |
| 2012/0325905 A1* | 12/2012 | Kim | G06K 19/07707 235/380 |
| 2013/0024947 A1* | 1/2013 | Holland | G06F 21/60 726/28 |
| 2013/0124292 A1* | 5/2013 | Juthani | H04L 63/083 705/14.26 |
| 2013/0124855 A1* | 5/2013 | Varadarajan | G06F 21/31 713/155 |
| 2013/0318347 A1* | 11/2013 | Moffat | H04L 67/303 713/168 |
| 2013/0341394 A1* | 12/2013 | Seo | G07C 9/253 235/380 |
| 2014/0001253 A1* | 1/2014 | Smith | G06Q 20/3276 235/375 |
| 2014/0201831 A1* | 7/2014 | Yi | G06F 21/36 726/19 |
| 2014/0330726 A1* | 11/2014 | Ball | G07F 7/1025 705/67 |
| 2014/0375422 A1* | 12/2014 | Huber | G07C 9/00571 340/5.61 |
| 2015/0006405 A1* | 1/2015 | Palmer | G06Q 20/3226 705/72 |
| 2015/0172920 A1* | 6/2015 | Ben Ayed | H04L 63/0492 713/172 |
| 2015/0178724 A1* | 6/2015 | Ngo | G06Q 20/3829 705/71 |
| 2015/0207791 A1* | 7/2015 | Johnson | H04L 63/083 713/185 |
| 2015/0269331 A1* | 9/2015 | Bolanos | G16Z 99/00 705/51 |
| 2015/0326563 A1* | 11/2015 | Chan | H04N 21/4367 713/172 |
| 2016/0104161 A1* | 4/2016 | Butler | G07F 7/0846 705/44 |
| 2016/0148194 A1* | 5/2016 | Guillaud | G07F 7/0846 705/44 |
| 2016/0182495 A1* | 6/2016 | Stuntebeck | H04W 12/06 713/156 |
| 2016/0306994 A1* | 10/2016 | Olsen-Kreusch | G06F 21/602 |
| 2016/0314720 A1* | 10/2016 | Kim | G09C 5/00 |
| 2016/0357981 A1* | 12/2016 | Tzeng | G06F 21/6218 |
| 2017/0329944 A1* | 11/2017 | Satyavarapu | H04L 63/10 |
| 2018/0295120 A1* | 10/2018 | Dawson | H04L 63/0861 |
| 2019/0132299 A1* | 5/2019 | Tucker | H04L 9/0822 |
| 2019/0205547 A1* | 7/2019 | Horvath | G06F 21/6227 |
| 2019/0377863 A1* | 12/2019 | Zhao | G06F 21/46 |
| 2020/0228337 A1* | 7/2020 | Sumien | H04W 12/069 |
| 2021/0209582 A1* | 7/2021 | Paliwal | G06Q 20/3274 |

OTHER PUBLICATIONS

Huang et al.; Efficient access control system based on aesthetic QR code; springer (Year: 2018).*

Mittra et al.; A Desktop Application of QR Code for Data Security and Authentication; 2016 International Conference on Inventive Computation Technologies (ICICT);2016;2; ;10.1109/INVENTIVE. 2016.7824809 (Year: 2016).*

Malathi V., Achieving Privacy and Security using QR Code by means of Encryption Technique in ATM; 2017 Second International Conference on Recent Trends and Challenges in Computational Models (Year: 2017).*

Pavan, et al.; Multi-Factor Authentication Using IMEI Encrypted Color QR Code, 3rd International Conference on Recent Trends in Engineering and Technology May 4 and 5, 2018 (Year: 2018).*

* cited by examiner

TRANSIENT PLIANT ENCRYPTION WITH INDICATIVE NANO DISPLAY CARDS

BACKGROUND

The transmission of resources can occur quickly and securely through the use of modern resource transfer mechanisms. While the simplicity of transferring information via a personalized resource transfer card is traditionally welcomed, resource security concerns arise when the sensitive resources are being transmitted. As such, additional security measures, including the use of secure dynamic authorization credential values, are desired to protect the integrity of sensitive resources in resource transfer interactions.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for secure contactless distribution of dynamic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may generally comprise a system for transient pliant encryption with indicative nano-display cards, the system comprising: a memory device; and a processing device operatively coupled to the memory device, wherein the processing device is configured to execute computer-readable program code to: receive and store user credentials for a user; periodically double encrypt the stored user credentials at a specified interval of time; and display the encrypted user credentials via a nano-display, wherein the nano-display comprises an array of fields indicating the encrypted user credentials.

In some embodiments, the array of fields maps to encrypted user credentials and values indicating the one or more encryption algorithms used to encrypt the user credentials.

In some embodiments, the values indicating the one or more encryption algorithms used to encrypt the user credentials are randomly positioned in a different field on the array of fields for each successive encryption.

In some embodiments, double encrypting the stored user credentials at a specified interval of time further comprises; selecting two encryptions algorithms from a repository of stored encryptions algorithms; and ensuring that encrypted output from the two selected encryption algorithms does not produce an identical value for an identical field on the nano-display as compared to the immediately preceding encryption output.

In some embodiments, the array of fields indicated the encrypted user credentials further comprises multiple colorized fields, wherein a color displayed on the multiple colorized fields indicates an alphanumeric character.

In some embodiments, the nano-display further comprises a light emitting diode display configured to display prestored colored images.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Figure 1:
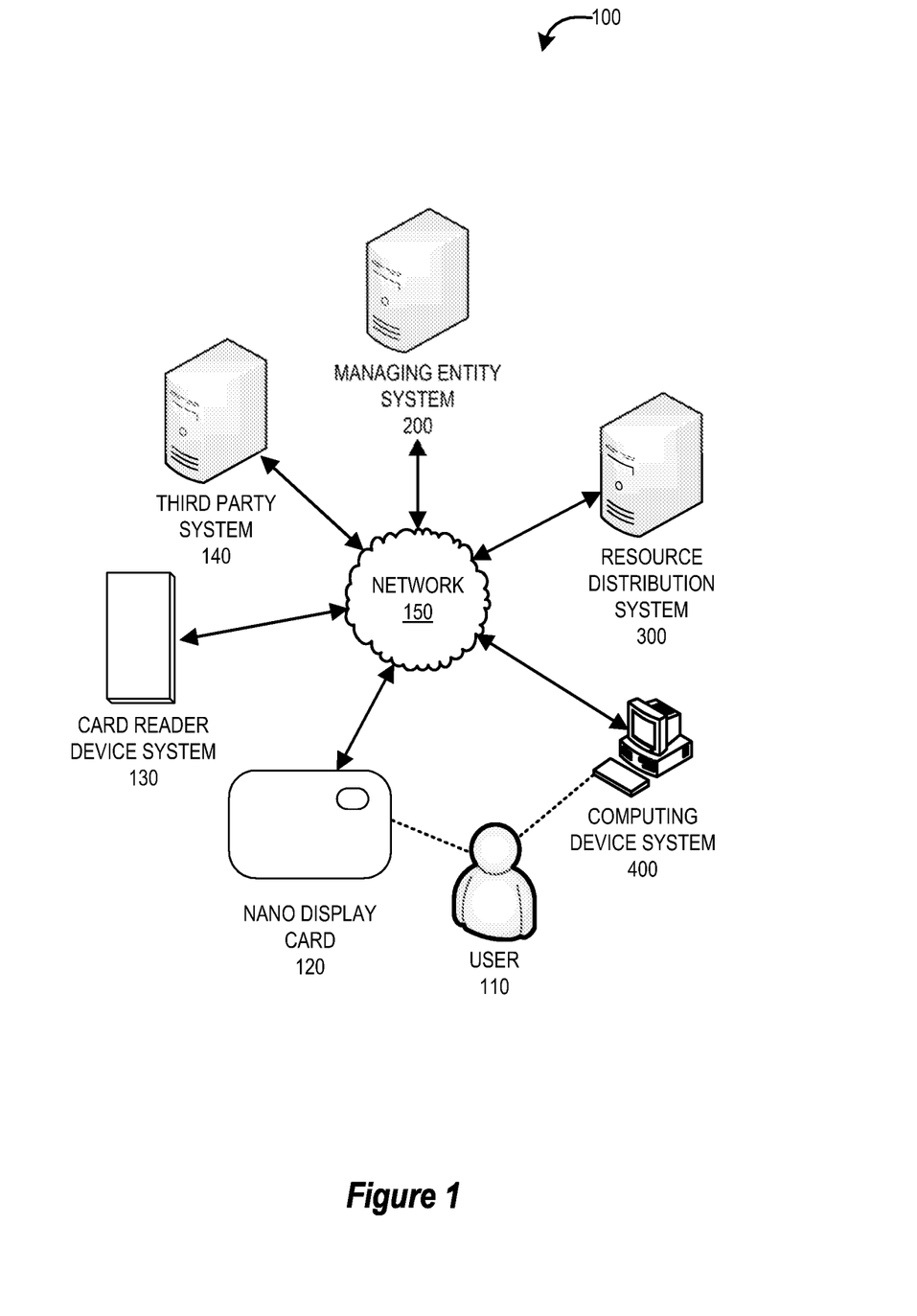
FIG. 1 provides a block diagram illustrating a system environment for transient pliant encryption with indicative nano-display cards, in accordance with an embodiment of the invention.

FIG. 1 provides a block diagram illustrating a system environment 100 for transient pliant encryption with indicative nano-display cards, in accordance with an embodiment of the invention. As illustrated in FIG. 1, the environment 100 includes a managing entity system 200, a resource distribution system 300, one or more computing device systems 400, a nano-display card 120 (e.g., a physical card with embedded nano-display), one or more card reader device systems 130, and one or more third party systems 140. One or more users 110 may be included in the system environment 100. In some embodiments, the user(s) 110 of the system environment 100 may be customers of a managing entity that controls or otherwise owns the managing entity system 200 and may, in some embodiments, comprise a financial institution.

The managing entity system 200, the resource distribution system 300, the one or more computing device systems 400, the nano-display card 120, the card reader device system 130, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the nano-display card 120 may be in connection with the network 150 only when the nano-display card 120 is within an interaction distance of the card reader device system 130, the third party system 140, or the computing device system 400, where the NFC interaction distance is a distance between the nano-display card 120 and reader device at which communication of information stored in the nano-display card 120 can occur.

The managing entity system 200 may be a system owned or otherwise controlled by a managing entity to perform one or more process steps described herein. In some embodiments, the managing entity is a financial institution. In general, the managing entity system 200 is configured to communicate information or instructions with the resource distribution system 300, the one or more computing device systems 400, and/or the third party system 140 across the network 150. For example, the managing entity system 200 may maintain account data for the user 110 and therefore may receive a transaction request associated with the user 110 (e.g., via a third party system 140 comprising a merchant system), compare received information to an internal database associated with the user 110, and transmit authentication or other approval information to the resource distribution system 300, the card reader device system 130, the third party system 140, the computing device system 400, or the like. Of course, the managing entity system 200 may be configured to perform (or instruct other systems to perform) one or more other process steps described herein. The managing entity system 200 is described in more detail with respect to FIG. 2.

The resource distribution system 300 may be a system owned or controlled by the managing entity and/or a third party that specializes in transactions involving nano-display cards, dynamic card verification value systems, user authentication systems, transaction rule systems, and the like. In some embodiments, at least a portion of the resource distribution system 300 may be controlled by or otherwise be a component of the managing entity system 200. In general, the resource distribution system 300 is configured to communicate information or instructions with the managing entity system 200, the one or more computing device systems 400, the nano-display card 120, the card reader device system 130, and/or the third party system 140 across the network 150.

For example, the resource distribution system 300 may receive dynamic data values from the third party system 140, the managing entity system 200, the computing device system 400, the card reader device system 130, or the nano-display card 120 (e.g., indirectly, via another system). The resource distribution system 300 may then compare received dynamic data values to an expected dynamic data value stored associated with the user to determine whether the dynamic data value matches the expected dynamic data value and automatically cause the computing device system 400 of the user 110 to populate a digital wallet application with information extracted from the nano-display card 120. Of course the resource distribution system 300 may be configured to perform (or instruct other systems to perform) one or more other process steps described herein, including the steps described with respect to FIG. 5. The resource distribution system 300 is described in more detail with respect to FIG. 3.

The computing device system 400 may be a system owned or controlled by the managing entity, the user 110, and/or a third party that specializes in providing computers, mobile devices, or other computing devices that are configured to securely store and maintain user account information and/or initiate resource transfer requests. The computing device system 400 may, in some embodiments, include a nano card display reader, writer, or other module configured to interact with nano-display cards.

In general, the computing device system 400 is configured to communicate information or instructions with the managing entity system 200, the resource distribution system 300, the nano-display card 120, the card reader device system 130, and/or the third party system 140 across the network 150. For example, the computing device system 400 may detect a nano-display card interaction with the nano-display card 120, extract resource information from the nano-display card, including a dynamic data value, transmit the dynamic data value to the managing entity system 200 and/or the resource distribution system 300, and receive a confirmation that the transmitted dynamic data value matches an expected dynamic data value for the user 110. Of course, the computing device system 400 may be configured to perform (or instruct other systems to perform) one or more other process steps described herein, including the steps described with respect to FIG. 5. The computing device system 400 is described in more detail with respect to FIG. 4.

The nano-display card 120 may comprise any card or other physical device that includes a nano-display, or the like that is configured to store information, data, codes, or the like and display dynamic authorization information readable by the card reader device system 130 or computing device system 400. In some embodiments, the nano-display card 120 may be a physical card (e.g., a credit card, a debit card, a gift card, or the like). The nano-display card 120 may also be embedded within or otherwise be a component of another physical element including, but not limited to, a check, a receipt, a bill, a financial statement, an physical letter comprising an offer for a financial account, or the like.

In some embodiments, the nano-display card is a component of the computing device system 400 (e.g., a nano-display embedded in or connected to a mobile phone, a smart watch, an Internet of things device, or the like). While a single nano-display card 120 is illustrated in FIG. 1, it should be known that multiple nano-display cards 120 may be present in the system environment 100, and different nano-display cards 120 may be utilized to perform one or more of the process steps described herein.

In some embodiments, the nano-display card 120 is in direct communication with, or is otherwise manipulated by a dynamic resource element (e.g., a dynamic card verification value, a dynamic card verification code, a digital dynamic card verification value, a time based number, a card-unique key, or the like). For example, in embodiments where the nano-display card 120 is stored on a physical card, the same physical card may additionally include a digital dynamic card verification value component that automatically, or in response to a user depressing a triggering button on the card, causes the nano-display card 120 to transmit a dynamic resource value or dynamic data value to any card reader device system 130. The dynamic resource value may comprise a multi-character code that is based on a specific algorithm associated with the user 110 that is associated with the nano-display card (and the physical card), such that the dynamic resource value at any given time will match an expected dynamic resource value that can be determined based on the specific algorithm. The dynamic resource value may, in some embodiments, be an ordered display of colorized blocks that indicate a certain authorization code and encryption type. In still other embodiments, the dynamic resource value may be displayed as a succession of ordered characters, numbers, emojis, and the like that indicate an authorization code and method of encryption.

The nano-display card 120 may be issued by the managing entity system 200, the resource distribution system 300, or a third party system 140, and/or, in some embodiments, may be manipulated (e.g., data may be written onto the nano-display card 120) by the computing device system 400 associated with the user 110.

Information stored in the nano-display card 120 may comprise, but is not limited to, credit card information (e.g., card number information, user information, billing information, and the like), debit card information, account information for the associated user 110, user information associated with the user (e.g., shipping address, name, other accounts of the user 110, geographic region of the user 110, transaction rules established by or for the user 110, or the like), shipping information, authentication preference information, transaction amount threshold information, approved transaction type information (e.g., approved merchants, approved product or service types, or the like), prohibited transaction type information (e.g., prohibited merchants, prohibited product or service types, or the like), an image associated with the user 110 (e.g., an image of the face of the user 110, a security image associated with the user 110, or the like), and transaction rules associated with the user 110 and/or an associated card or account of the user 110.

In some embodiments, this information stored in the nano-display card 120 may be stored in the form of standard codes that are readable by card reader devices (e.g., the card reader device system 130), nano-display reader modules, automated teller machines (ATMs), or the like. In some embodiments, at least some of the information stored in the nano-display card 120 comprises codes that can be extracted by card reader devices and then transmitted to the managing entity system 200 and/or the resource distribution system 300 to prompt those systems to match the extracted codes to the associated information that can then be transmitted back to the card reader devices or associated devices or systems. For example, information that would otherwise require the transfer of a large amount of data (e.g., an image of the face of the user, a transaction rule, or the like) to efficiently effectuate the communication of that information from the nano-display card 120 to a card reader device system 130 (which may include a computing device system 400) may instead be communicated as a code which is communicated to the managing entity system 200, which in turn responds with the large amount of data.

The card reader device system 130, while illustrated as a stand-alone device, may be a component of the managing entity system 200, the resource distribution system 300, the computing device system 400, and/or a third party system 140. For example, in some embodiments, the card reader device system 130 comprises a point of sale device associated with a merchant system (e.g., a third party system 140), an ATM, a mobile computing system with nano-display reader device, and the like. In some embodiments, the card reader device system 130 comprises a nano-display reader module, a camera, a sensor, or the like that is associated with the user 110 and/or the computing device system 400 of the user 110. For example, the card reader device system 130 may comprise a nano-display reader module that is a component of the computing device system 140. In another example, the card reader device system 130 may comprise a nano-display reader module that is separate from the computing device system 400 of the user 110, but is known to be in a secure location associated with the user 110 (e.g., located in a home of the user 110, located in a secure office of the user 110, located within a vehicle of the user 110, or the like). In some embodiments of this system environment 100, the user 110 is associated with two separate computing device systems 400 (e.g., a mobile phone and a personal computer device). In such embodiments, the card reader device system 130 may comprise a nano-display reader module located within one or both of the multiple computing device systems 400.

The card reader device system 130 may comprise a network communication interface, a processing device, and one or more memory devices, where the processing devices are configured to perform certain actions with the memory devices and communicate these actions to the rest of the network 150 through the network communication interface.

The third party system 140 may be any system that interacts with the other systems and devices of the system environment 100 including, but not limited to, merchant systems, automated teller machine device systems, point of sale device systems, online merchant portal systems, regulatory agency systems, data storage systems, third party user authentication systems, third party credit card or debit card systems, transaction systems, and the like.

Figure 2:
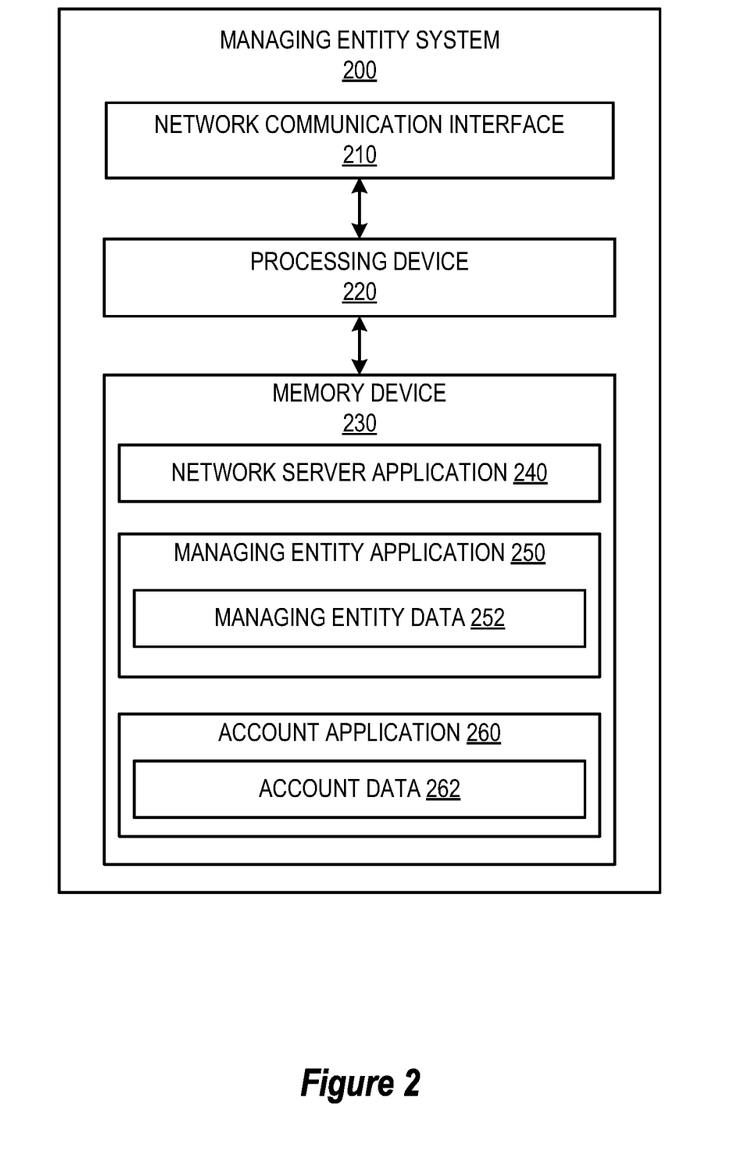
FIG. 2 provides a block diagram illustrating the managing entity system of FIG. 1, in accordance with an embodiment of the invention.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, an account application 260 which includes account data 262, and other computer-executable instructions or other data. The computer-executable program code of the network server application 240, the managing entity application 250, and/or the account application 260 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise user information for one or more users that are customers of or are otherwise associated with the managing entity. The managing entity data 252 may additionally include transaction data, including information for establishing secure communication channels with transaction devices, authentication devices, card reader devices, and the like.

In one embodiment, the account application 260 includes the account data 262. This account data 262 may include financial account information for one or more users associated with the managing entity system 200. For example, the account data 262 may comprise account numbers, routing numbers, account balances, account rules, account preferences, billing information, credit information, loan information, authentication information, dynamic resource value information, expected dynamic resource value information, and the like.

The network server application 240, the managing entity application 250, and the account application 260 are configured to invoke or use the managing entity data 252, the account data 254, and the like when communicating through the network communication interface 210 with the resource distribution system 300, the one or more computing device systems 400, the nano-display card 120, the Card reader device system(s) 130, and/or the third party system 140.

Figure 3:
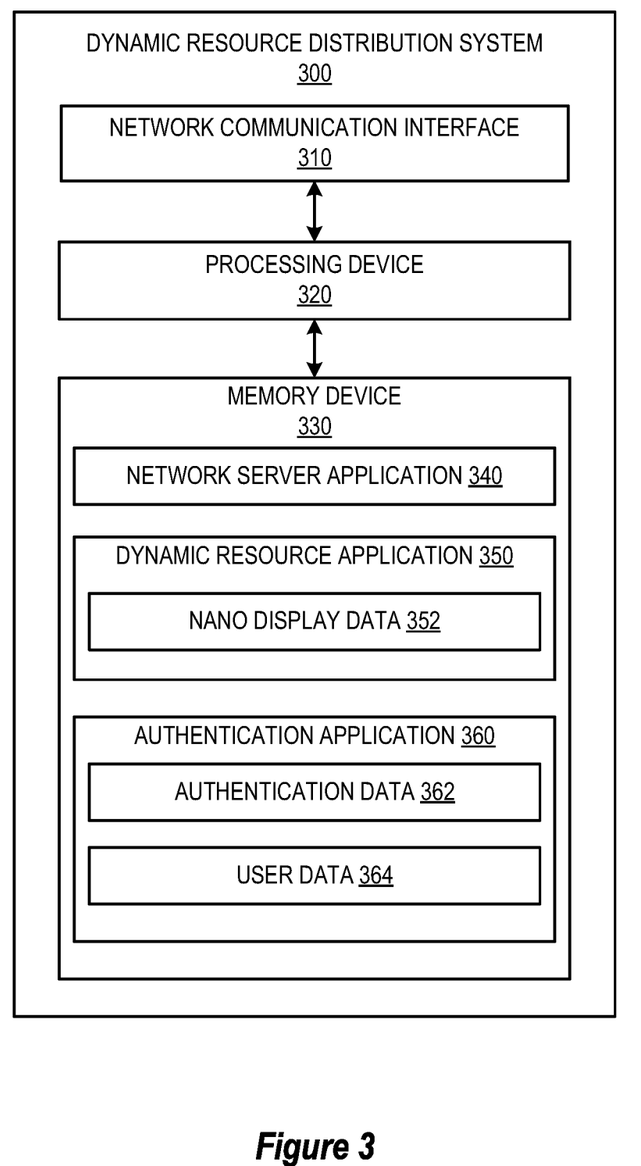
FIG. 3 provides a block diagram illustrating the resource distribution system FIG. 1, in accordance with an embodiment of the invention.

FIG. 3 provides a block diagram illustrating the resource distribution system 300, in greater detail, in accordance with embodiments of the invention. As illustrated in FIG. 3, in one embodiment of the invention, the resource distribution system 300 includes one or more processing devices 320 operatively coupled to a network communication interface 310 and a memory device 330. In certain embodiments, the resource distribution system 300 is operated by a first entity, such as a financial institution, while in other embodiments, the resource distribution system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the resource distribution system 300 described herein. For example, in one embodiment of the resource distribution system 300, the memory device 330 includes, but is not limited to, a network server application 340, a dynamic resource application 350 which includes nano-display data 352, an authentication application 360 which includes a authentication data 362 and user data 354, and other computer-executable instructions or other data. The computer-executable program code of the network server application 340, the dynamic resource application 350, and/or the authentication application 360 may instruct the processing device 320 to perform certain logic, data-processing, and data-storing functions of the resource distribution system 300 described herein, as well as communication functions of the resource distribution system 300.

In one embodiment, the dynamic resource application 350 includes nano-display data 352. The nano-display data 352 may comprise information for writing data or information associated with one or more users onto nano-display cards associated with those one or more users. The nano-display data 352 may additionally or alternatively include information for comparing data received from nano-display interactions to a stored database (e.g., a relational database) of associated information. For example, the nano-display data 352 may include codes and associated information (e.g., transaction rules, images of users, documents associated with users, or the like) such that when the resource distribution system 300 receives a code from a nano-display interaction, the dynamic resource application 350 can match that code to its associated data in the database to identify or determine the associated information that is being referenced.

In one embodiment, the authentication application 360 includes authentication data 362 and user data 364. The authentication data 362 may include passwords, personal identification numbers, security questions, biometric information, dynamic resource value information, expected dynamic resource value information, authentication images (e.g., images of a user's face), stepped-up authentication information, or other authentication credentials (including secondary or stepped-up authentication credentials) associated with one or more users. This authentication data 362 can be accessed by the authentication application 360 to compare received authentication credentials to the stored authentication credentials when determining whether a user is authorized for a transaction, for receiving access to an account, for receiving access to a digital wallet, or the like. The user data 364 may comprise any additional information that the authentication application 360 may store for use in authenticating a user, establishing a nano-display card for a user (e.g., populating the nano-display with information about the user, the user's authentication requirements or rules, the user's account information, or the like).

The network server application 340, the dynamic resource application 350, and the authentication application 360 are configured to invoke or use the nano-display data 352, the authentication data 362, the user data 364, and the like when communicating through the network communication interface 310 with the managing entity system 200, the one or more computing device systems 400, the nano-display card 120, the Card reader device system(s) 130, and/or third party systems 140.

Figure 4:
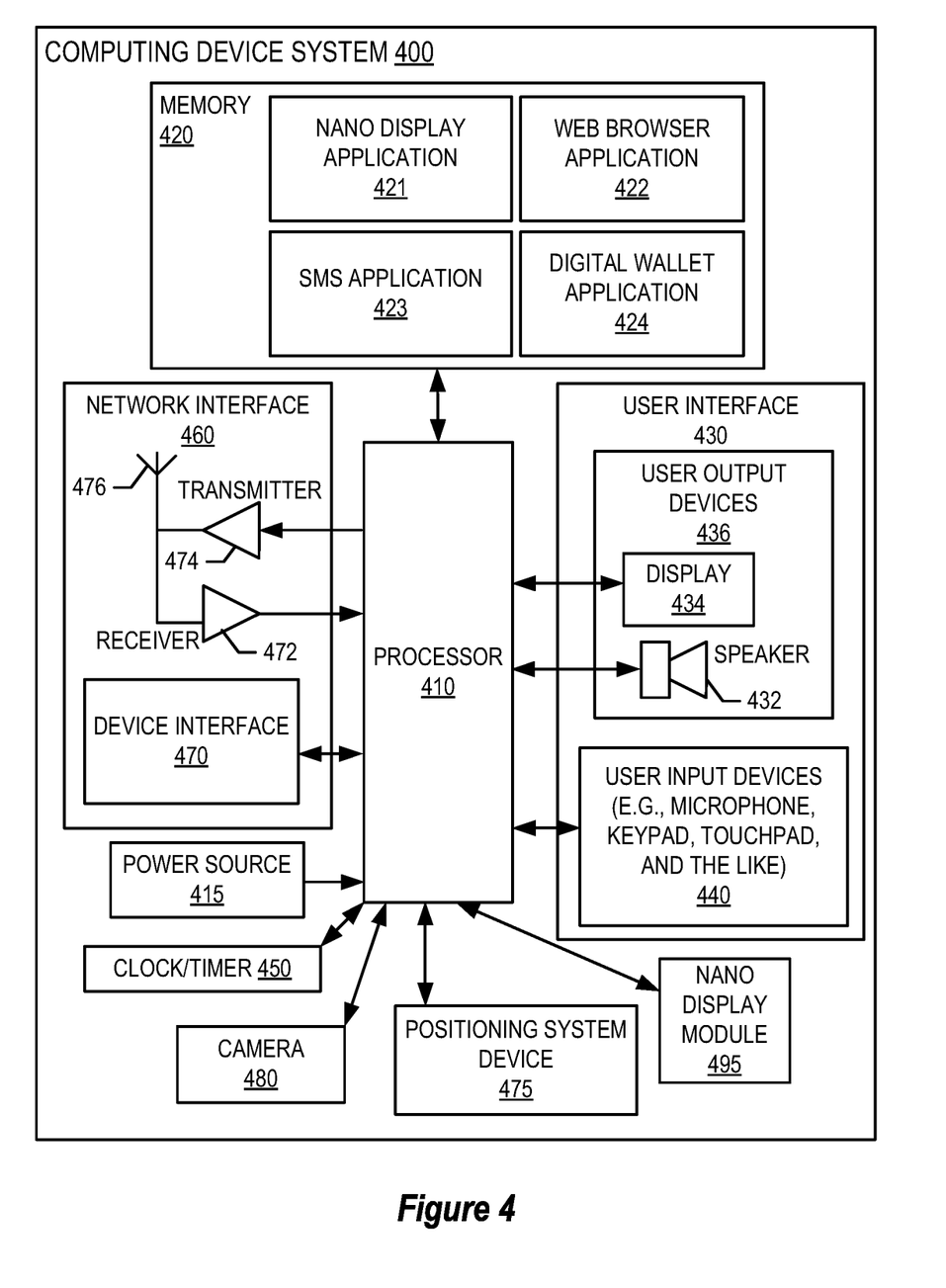
FIG. 4 provides a block diagram illustrating the computing device system of FIG. 1, in accordance with an embodiment of the invention.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Furthermore, it should be known that multiple computing device systems 400 may be owned by or accessed by the user 110 within the system environment 100 of FIG. 1, and these separate computing device systems 400 may be in network communication with each other and the other systems and devices of the system environment 100. For example, a first computing device system 400 may comprise a mobile phone of the user 110 that includes an NFC chip with resource data stored therein, and this mobile phone may be placed within an NFC interaction distance from an NFC reader device of a second computing device system 400 that comprises a personal computer of the user 110.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types.

By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, or a nano-display application 421, a digital wallet application 424, (or any other application provided by the managing entity system 200). These applications also typically instructions to a graphical user interface (GUI) on the display 430 that allows the user 110 to interact with the computing device system 400, the managing entity system 200, and/or other devices or systems. In one embodiment of the invention, when the user 110 decides to enroll in a nano-display application 421 program, the user 110 downloads, is assigned, or otherwise obtains the nano-display application 421 from the managing entity system 200, or from a distinct application server (e.g., from the resource distribution system 300). In other embodiments of the invention, the user 110 interacts with the managing entity system 200 or the resource distribution system 300 via the web browser application 422 in addition to, or instead of, the nano-display application 421. The same mechanisms may be put in place to install, store, or otherwise access the digital wallet application 424.

The memory 420 of the computing device system 400 may comprise a Short Message Service (SMS) application 423 configured to send, receive, and store data, information, communications, alerts, and the like via a wireless telephone network.

The nano-display application 421 may comprise an application stored in the memory 420 that is configured to control and/or communicate with a nano-display module 495 of the mobile device system 400 to receive nano-display data or information (e.g., codes, signals, or the like) from nano-display cards (e.g., the nano-display card 120 described with respect to FIG. 1). The nano-display application 421 may also be configured to communicate information received from the nano-display module 495 to the digital wallet application 424, the web browser application 422, and/or the SMS application 423. In some embodiments, the nano-display application 421 may be configured to receive instructions from a separate system (e.g., the managing entity system 200, the resource distribution system 300, a separate computing device system 400, an card reader device system 130, and/or a third party system 140 like a merchant system) and cause one or more components of the computing device system 400 to perform one or more actions. For example, the nano-display application 421 may be configured to receive instructions for erasing certain information from a nano-display card and writing new information on that nano-display card. The nano-display application 421 may then cause the nano-display module 495 to erase the certain information from a nano-display card that is within an interaction distance of the nano-display module 495 and then write the new information onto the nano-display card.

The digital wallet application 424 of the computing device system 400 may comprise an application created by and/or managed by a financial institution that is configured to securely store financial information, account information, user information, billing information, shipping information, authentication information, dynamic resource value information (e.g., dynamic card verification code information), or the like. The digital wallet application 424 may be configured to receive account or card information (e.g., credit card information) from that has been extracted from a nano-display card and automatically populate fields within the digital wallet application 424 with the extracted information. For example, the extracted information may be formatted such that the information type and the information field is known and by the digital wallet application 424 (e.g., based on position or coding within the extracted nano-display data) and can therefore be matched to an applicable field of the digital wallet application 424.

The digital wallet application 424 may additionally be configured to initiate or otherwise communicate information as part of a transaction request. For example, the user 110 may use the computing device system 400 to initiate a transaction by tapping or otherwise positioning the nano-display module 495 of the computing device system 400 within an interaction distance from a point of sale device comprising an card reader device (e.g., the card reader device system 130). This interaction may prompt the digital wallet application 424 to provide transaction information (e.g., credit card information, user name, billing information, and/or the like), and the digital wallet application 424 may then transmit the transaction information to the point of sale device for the purpose of conducting and/or authenticating the requested transaction.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein. For example, the memory 420 may include such data as transaction history data, positional data of the computing device system 400, and the like.

Figure 5:
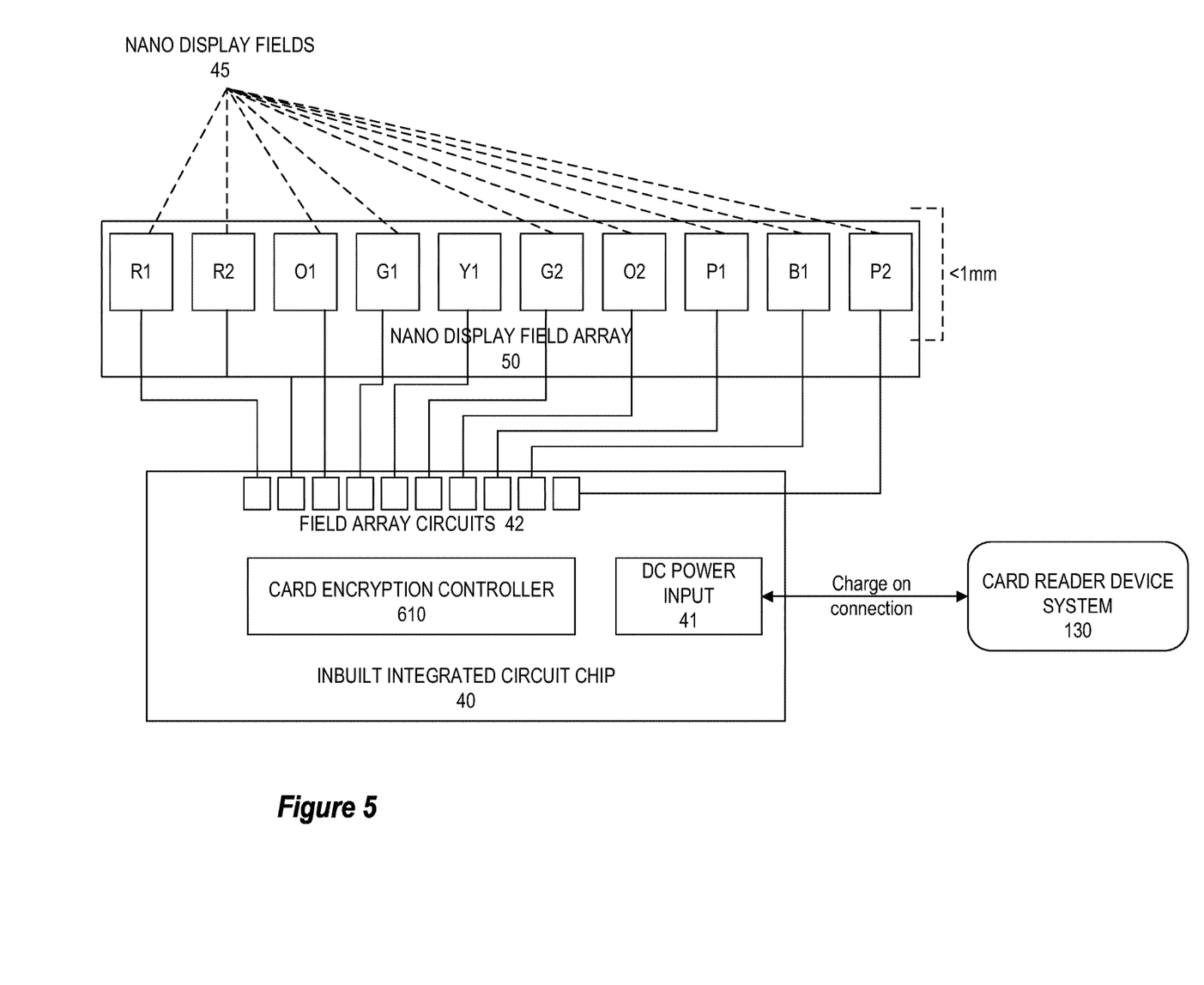
FIG. 5 provides a block diagram to illustrate one embodiment of a nano-display, in accordance with embodiments of the invention.

Referring now to FIG. 5, a block diagram is provided to illustrate one embodiment of a nano-display, in accordance with embodiments of the invention. As shown, the nano-display includes nano-display field array 50, which includes on or more nano-display field(s) 45. Each of the one or more nano-display field(s) 45 may be configured to display pre-stored colored images that are illuminated by the nano-display. In some embodiments, the nano-display field array may be comprised of light emitting diodes, otherwise known as an LED display. As shown in the representative embodiment of FIG. 5, the height of the nano-display field array 50 may be designed to be a height of less than 5 millimeters, allowing the nano-display field array 50 to be placed inconspicuously on a carriable user device or payment card. The relatively small size of the nano-display is intentionally designed to enhance security of the system by thwarting the ability of a third party or malfeasant user from observing or attempting to decipher information shown on the nano-display.

Each of the nano-display field(s) 45 in FIG. 5 conveys alphanumeric characters that are represented by colors and color shades in this particular embodiment. In this specific embodiment depicted, the first character represents a color, while the second character represents a shade. For instance, R1 as shown in the nano-display field 45 to the far left may represent a "first" shade of red, whereas P2 shown on the far right may represent a "second" shade of purple. It is notable that the embodiment in FIG. 5 does not contain any repeated shades of colors, which allows the nano-display field array to convey a wide range of information via differing shades of color. As discussed previously, the nano-display field array may be configured in further embodiments to display other information besides color alone, such as alphanumeric characters, emojis, pictures, and the like. As further depicted in FIG. 5, the nano-display field array(s) 45 are connected to an inbuild integrated circuit chip 40 via individualized field array circuits 42 which correspond to each of the one or more nano-display field array(s) 45. Also located on the inbuild integrated circuit chip 40 is a card encryption controller 610, discussed in more detail with regard to FIG. 7, and a direct current (DC) power input 41 which is designed to draw power from the card reader device system 130 during connection or while the nano-display card is being used with the card reader device system to convey information within an interaction distance.

Figure 6:
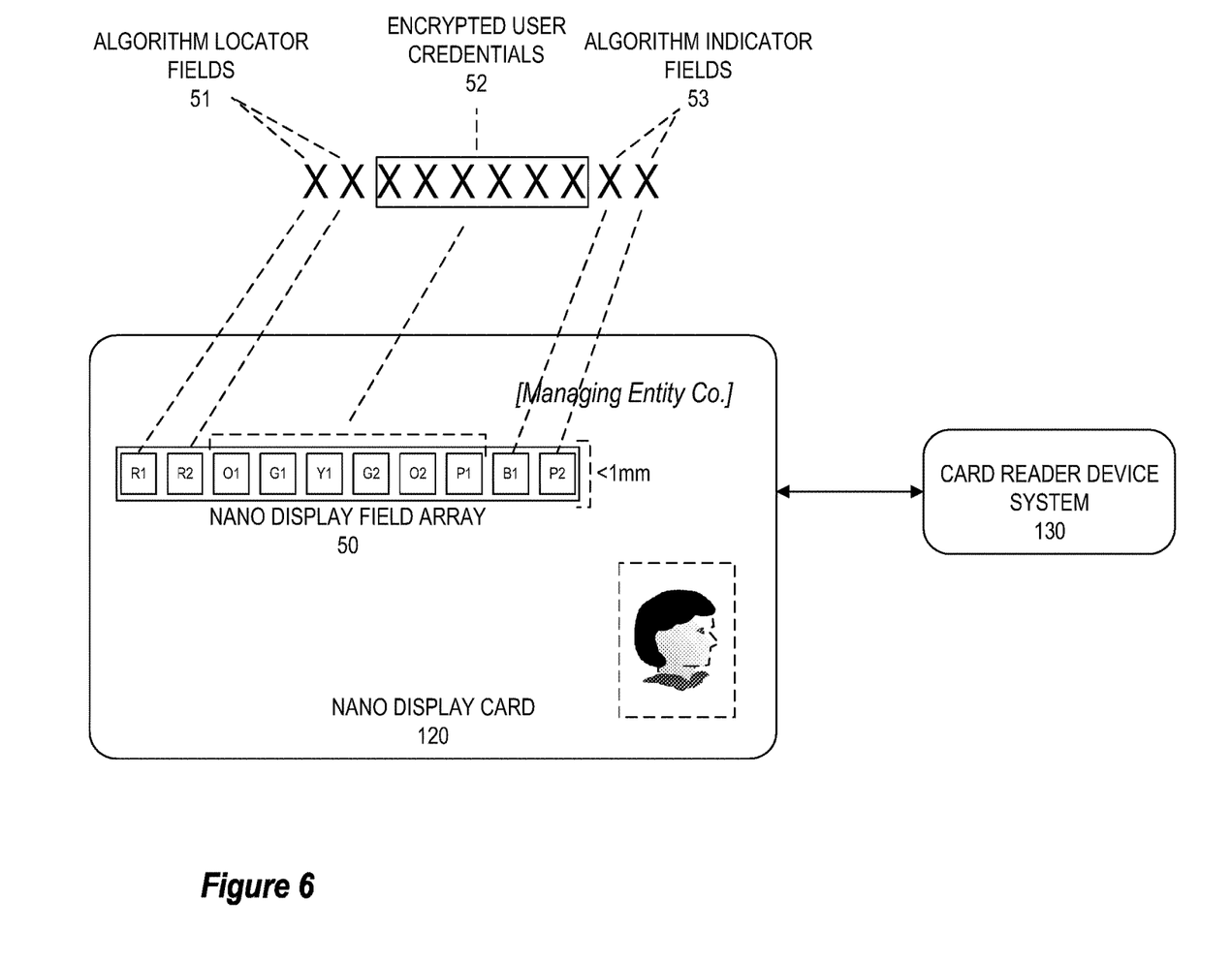
FIG. 6 provides a block diagram of a nano-display card and displayed information, in accordance with one embodiment of the invention.

Referring now to FIG. 6, a block diagram is provided of a nano-display card and displayed information, in accordance with one embodiment of the invention. The nano-display field array 50, as discussed in FIG. 5, is shown represented on the nano-display card 120. In some embodiments, the nano-display field array 50 may be displayed on one or both sides of the nano-display card 120. While any amount or variety of other information may be placed on the nano-display card 120, such as a name of a managing entity, a photo of a user, and the like, this information may be minimized in some embodiments in order to limit the amount of available identifying information to third parties, and thus increase the security of the system and the use of the nano-display card 120.

As shown the nano-display field array 50 may be configured to display certain information in specific nano-display fields 45. For instance, in the representative embodiment shown in FIG. 6, algorithm locator fields 51 are displayed in the first two nano-display array fields. The algorithm locator fields are encoded to communicate to the card reader device system 130 the location of the algorithm indicator fields 53. As previously discussed, the system is designed to encrypt user credentials using a selection of two unique encryption algorithms, producing encrypted user credentials 52 shown located in field three through field 8 in FIG. 6.

The multiple encryption algorithms selected by the system in any given iteration of encrypted information on the nano-display field array 50 are indicated in respective fields on the nano-display field array 50. In the embodiment shown in FIG. 6, the fields that communicate the encryption algorithms selected are field nine and field ten. This is indicated using the algorithm locator fields 51, fields one and two in FIG. 6, which display the numeric characters "9" and "10" respectively. This information indicates that fields nine and ten indicate the encryption algorithms used during this particular iteration. It is understood that the fields indicating the algorithms used to encrypt the user credentials, or the algorithm indicator fields 53, may change with each encryption iteration, in which case the algorithm locator fields 51 will also change accordingly. It is also noted that the nano-display field array 50 does not actually display the alphanumeric digits shown above it in FIG. 6, as indicated by the continued use of color code characters on the nano-display card 120 itself, as discussed in FIG. 5. While the representative embodiment used here continues with the example of color codes on the nano-display field array 50, it is again noted that the system design contemplates the use of other identifying information that may be displayed on the nano-display field array 50, such as pictures, designs, emojis, alphanumeric characters and the like. As information is communicated to the card reader device system 130, the color code information, or other displayed information, is transmitted from the nano-display card 120 to the card reader device system 130 where it is interpreted and converted to the appropriate alphanumeric characters to be analyzed and decrypted.

Figure 7:
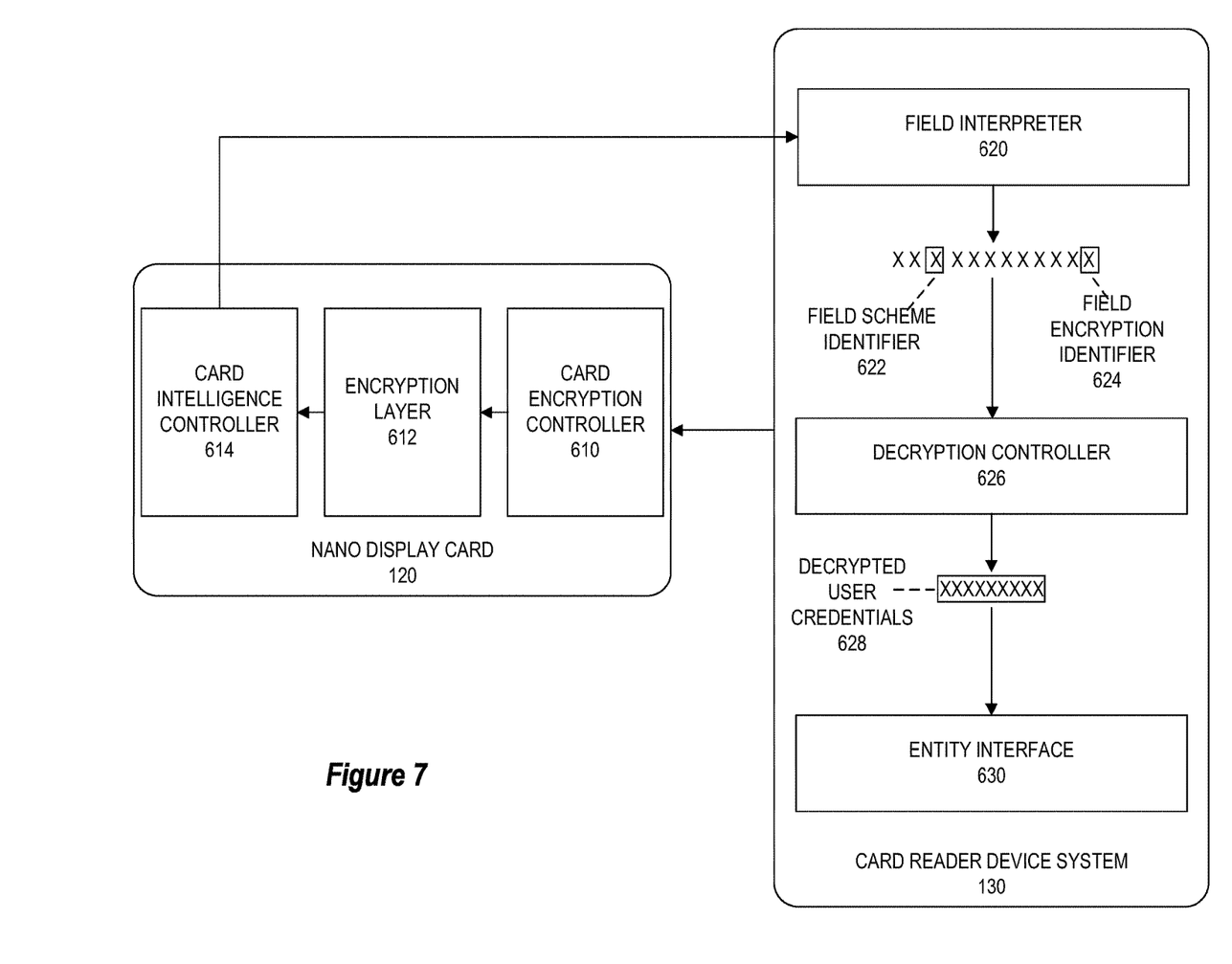
FIG. 7 provides a block diagram to illustrate the interface between nano-display card and card reader device system, in accordance with embodiments of the invention.

Referring now to FIG. 7, a block diagram is provided to illustrate the interface between nano-display card and card reader device system, in accordance with embodiments of the invention. As shown, the nano-display card 120 includes a card encryption controller 610, an encryption layer 612, and a card intelligence controller 614. The card encryption controller 610 is tasked with maintaining a transient timeout value that triggers the encryption of user credentials every certain amount of time, which may be a number of seconds, minutes, hours, and the like according to the manner in which the card encryption controller 610 is configured in a given embodiment of the invention. Once encryption is triggered by the card encryption controller 610, the encryption layer 612 then uses an adaptive encryption algorithm to double encrypt the user credentials. As discussed previously, the encryption layer 612 selects two different encryption algorithms with each iteration, ensuring that the same two encryption algorithms are not repeated within a given number of iterations. For example, if the invention is configured to select from 100 different algorithms, then the invention may be configured not to repeat the use of any one particular algorithm for a number of 50 encryption iterations.

Next, the card intelligence controller 614 is utilized to select a display scheme that will be displayed on the nano-display field array 50. Again, the invention is configured to avoid repetition between iterations in the vein of maximizing security. For instance, if a certain shade of a color is used to represent an encrypted alphanumeric character in the encrypted user credentials 52, the invention will automatically rule out color schemes in which the same alphanumeric character is represented by the same array display value, such as the same color or shade of color. The field interpreter 620 then interprets the displayed colors on the nano-display field array in order to decipher the field scheme used and the encryption schemes used. The field interpreter 620 appends the field scheme identifier 622 and the field encryption identifier 624 to the encrypted user credentials 52, and sends this information to the decryption controller 626. The decryption controller contains the necessary information to decrypt the encrypted user credentials 52, and outputs the decrypted user credentials 628, which may then be forwarded to the third party system 140, managing entity system 200, or resource distribution system 300 depending on the embodiment of the invention.

Figure 8:
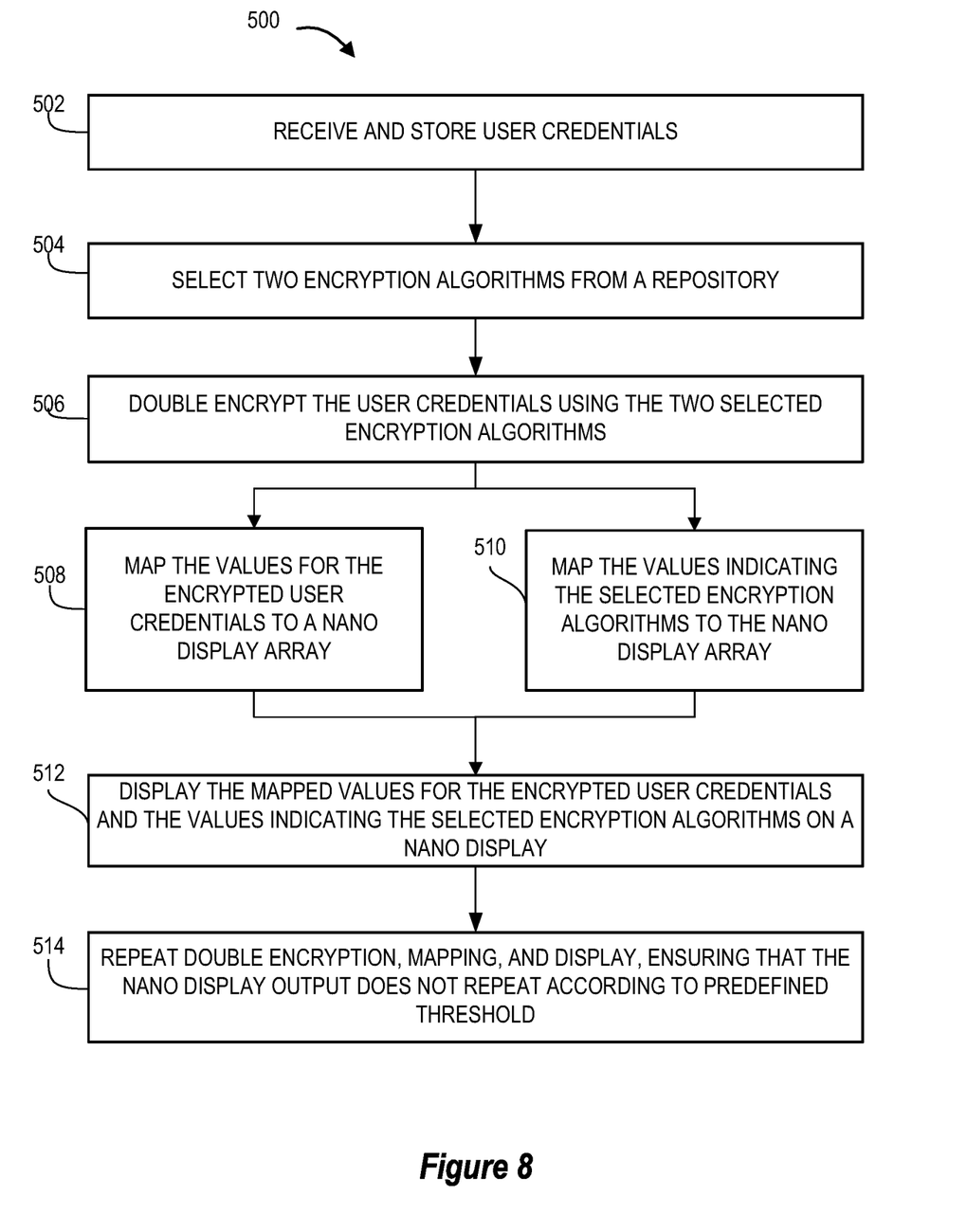
FIG. 8 provides a flowchart illustrating a process for transient pliant encryption with indicative nano-display cards, in accordance with an embodiment of the invention.

Referring now to FIG. 8, a flowchart is provided to illustrate one embodiment of a process for secure distribution of resources via transient pliant encryption with indicative nano-display cards, in accordance with embodiments of the invention. In some embodiments, the process 500 may include block 502, where the system receives and stores user credentials. In some embodiments, this the user credentials are stored on the nano-display card 120 itself, while in other embodiments the user credentials may be stored by the managing entity system 200 or on a computing device system 400 that is designed to interface with the nano-display card 120. The user credentials may include any number of pieces of identifying information or authorization credentials, such as a credit card number, expiration date, card verification value (CVV), and the like.

Next, as shown in block 504, the system selects two encryption algorithms from a repository of encryption algorithms. While the system may include any number of different encryption algorithms, the system may, for example, include 100 separate algorithms labeled 1 to 100. The system then encrypts the user credentials twice, or double encrypts the user credentials, in order to obtain an encrypted value for the user credentials, as shown in block 506.

The double encrypted user credentials are then mapped to the nano-display array located on the nano-display card 120, as shown in block 508. For instance, the nano-display card may include a panel that contains an array of 10 display fields programmed to display a set of prestored values, alphanumeric characters, emojis, colors, and the like. The system maps the double encrypted user credentials to a set number of display fields on the nano-display array. At the same time, the system also maps values indicating the selected encryption algorithms to two specific fields on the array of the nano-display card 120. For instance, in some embodiments, the nano-display array may be configure to display a series of colors, and the system may map the encrypted values for the user credentials and encryption algorithms to specific colors. In this way, the array on the nano-display card 120 will indicate the encrypted value of the user credentials, and also indicate the encryption algorithms used so that the card reader device system 130 may decipher and decrypt the displayed information.

Next, the system displays the mapped values for the encrypted user credentials and the value indicating the selected encryption algorithms on the nano-display array of the nano-display card 120. For example, in some embodiments, the nano-display array is a series of colors that are mapped to the encrypted user credentials. The encrypted values are mapped, as discussed previously, to a specific color to be displayed on specific field of the nano-display array. As shown in block 514, the steps of encryption, field mapping, and displaying are repeated at a given interval. For instance, the system may be configured to re-enrypt the user credentials every two minutes, such that the displayed information on the nano-display card 120 changes after the given interval. It is understood that this interval of time may be any set amount of time as determined by the system, the user, or a system administrator. To an uninformed observer, the nano-display array simply displays an array of colored fields that change after the programmed time interval.

In the interest of added security, the system is also designed not to repeat use of the same two encryption algorithms or to display the same resulting mapped information on the nano-display card 120 at back to back intervals. This may be achieved using a number of methods or a combination of methods. For instance, the system may be configured to select two algorithms from algorithms 1 to 100 only once for every 50 encryptions. In another embodiment, the system may compare the iterations of the algorithms to ensure that the specific order in which multiple algorithms used is not repeated. Furthermore, the system may initiate post-encryption changes during the field mapping step in order to ensure that the display array does not display the same value, character, or color in back to back iterations, or to ensure that the same value, character, or color does not represent the same underlying encrypted value in two back to back iterations. For instance, if the system determines that the number 8 should be mapped using the color orange in one iteration, the system will check in the next iteration to ensure that orange is not used to represent the number 8 in the next iteration. Additionally, the system may reorganize the mapping structure in order to ensure that the information displayed on the nano-display card is not conveyed in a predictable manner. For instance, the nano-display card 120 may include 10 fields on the display array, each able to display a color. In one iteration, field 9 and field 10 may indicate the specific algorithms used to encrypt the user credentials. In some embodiments, the system may ensure that fields 1 through 8 are used during the following iteration in order to ensure that the same fields do not contain the same identifying information in back to back display iterations.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for transient pliant encryption with indicative nano-display cards, the system comprising:
    a memory device; and
    a processing device operatively coupled to the memory device, wherein the processing device is configured to execute computer-readable program code to:
        receive and store user credentials for a user;
        double encrypt the stored user credentials, wherein double encrypting the stored user credentials further comprises the use of two different encryption algorithms;
        generate a colorized display mapping for the encrypted user credentials via a nano-display, wherein the nano-display comprises an array of fields indicating the encrypted user credentials, wherein the array of fields maps to encrypted user credentials and values indicating the one or more encryption algorithms used to encrypt the user credentials, and wherein the values indicating the one or more encryption algorithms used to encrypt the user credentials are randomly positioned in a different field on the array of fields for each successive encryption;
        establish a timeout value, wherein the timeout value comprises an amount of time for which the encrypted user credentials are displayed via the nano-display;
        at the end of the timeout value, trigger a repetition of the double encryption; and
        generate and display an updated colorized display mapping via the nano-display.

2. The system of claim 1, wherein the nano-display comprises a display with a height of less than 1 millimeter.

3. The system of claim 1, wherein double encrypting the stored user credentials at a specified interval of time further comprises:
    selecting two encryptions algorithms from a repository of stored encryptions algorithms; and
    ensuring that encrypted output from the two selected encryption algorithms does not produce an identical value for an identical field on the nano-display as compared to the immediately preceding encryption output.

4. The system of claim 1, wherein the array of fields indicated the encrypted user credentials further comprises multiple colorized fields, wherein a color displayed on the multiple colorized fields indicates an alphanumeric character.

5. The system of claim 1, wherein the nano-display further comprises a light emitting diode display configured to display prestored colored images, wherein the colored images comprise a selection of shades of the prestored colored images.

6. A computer-implemented method for transient pliant encryption with indicative nano-display cards, the system comprising:
    receiving and storing user credentials for a user;
    double encrypting the stored user credentials, wherein double encrypting the stored user credentials further comprises the use of two different encryption algorithms;
    generating a colorized display mapping for the encrypted user credentials via a nano-display, wherein the nano-display comprises an array of fields indicating the encrypted user credentials, wherein the array of fields maps to encrypted user credentials and values indicating the one or more encryption algorithms used to encrypt the user credentials, and wherein the values indicating the one or more encryption algorithms used to encrypt the user credentials are randomly positioned in a different field on the array of fields for each successive encryption;

establishing a timeout value, wherein the timeout value comprises an amount of time for which the encrypted user credentials are displayed via the nano-display;

at the end of the timeout value, triggering a repetition of the double encryption; and generating and displaying an updated colorized display mapping via the nano-display.

7. The computer-implemented method of claim 6, wherein the nano-display comprises a display with a height of less than 1 millimeter.

8. The computer-implemented method of claim 6, wherein double encrypting the stored user credentials at a specified interval of time further comprises:

selecting two encryptions algorithms from a repository of stored encryptions algorithms; and ensuring that encrypted output from the two selected encryption algorithms does not produce an identical value for an identical field on the nano-display as compared to the immediately preceding encryption output.

9. The computer-implemented method of claim 6, wherein the array of fields indicated the encrypted user credentials further comprises multiple colorized fields, wherein a color displayed on the multiple colorized fields indicates an alphanumeric character.

10. The computer-implemented method of claim 6, wherein the nano-display further comprises a light emitting diode display configured to display prestored colored images.

11. A computer program product for transient pliant encryption with indicative nano-display cards, the computer program product comprising at least one non-transitory computer-readable medium having computer-readable program code portions embodied therein, the computer-readable program code portions comprising:

an executable portion configured for receiving and storing user credentials for a user;

an executable portion configured for double encrypting the stored user credentials, wherein double encrypting the stored user credentials further comprises the use of two different encryption algorithms;

an executable portion configured for generating a colorized display mapping for the encrypted user credentials via a nano-display, wherein the nano-display comprises an array of fields indicating the encrypted user credentials, wherein the array of fields maps to encrypted user credentials and values indicating the one or more encryption algorithms used to encrypt the user credentials, and wherein the values indicating the one or more encryption algorithms used to encrypt the user credentials are randomly positioned in a different field on the array of fields for each successive encryption;

an executable portion configured for establishing a timeout value, wherein the timeout value comprises an amount of time for which the encrypted user credentials are displayed via the nano-display;

an executable portion configured for, at the end of the timeout value, triggering a repetition of the double encryption; and an executable portion configured for generating and displaying an updated colorized display mapping via the nano-display.

12. The computer program product of claim 11, wherein double encrypting the stored user credentials at a specified interval of time further comprises:

selecting two encryptions algorithms from a repository of stored encryptions algorithms; and ensuring that encrypted output from the two selected encryption algorithms does not produce an identical value for an identical field on the nano-display as compared to the immediately preceding encryption output.

13. The computer program product of claim 11, wherein the array of fields indicated the encrypted user credentials further comprises multiple colorized fields, wherein a color displayed on the multiple colorized fields indicates an alphanumeric character.

14. The computer program product of claim 11, wherein the nano-display further comprises a light emitting diode display configured to display prestored colored images.

* * * * *